Dec. 28, 1937.  W. I. CONANT ET AL  2,103,349
CHECK VALVE DEVICE
Filed Feb. 29, 1936
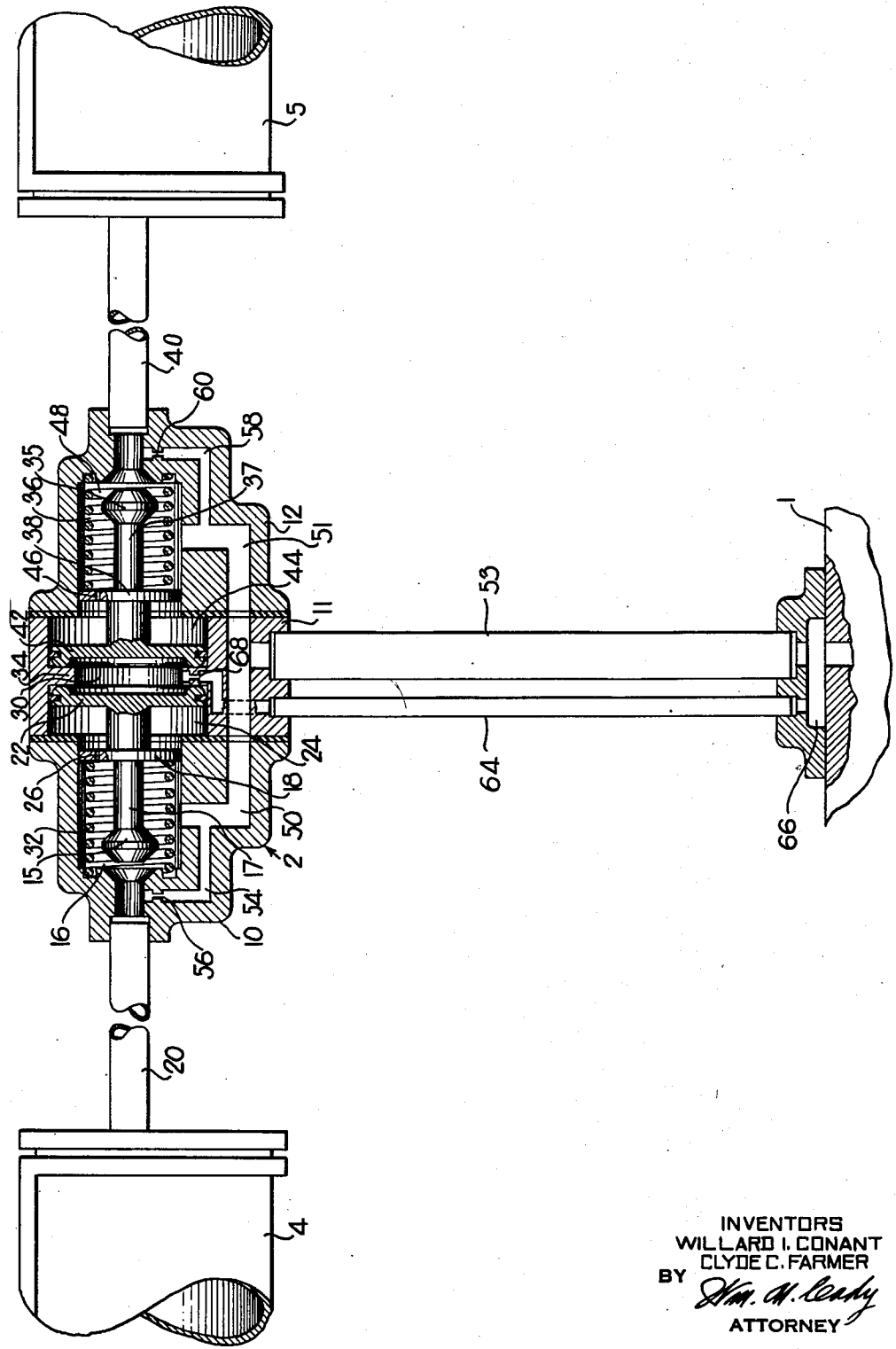
INVENTORS
WILLARD I. CONANT
CLYDE C. FARMER
BY
*Wm. N. Cady*
ATTORNEY Patented Dec. 28, 1937

2,103,349

UNITED STATES PATENT OFFICE 2,103,349

CHECK VALVE DEVICE

Willard I. Conant, Decatur, Ill., and Clyde C. Farmer, Pittsburgh, Pa., assignors to The Westinghouse Air Brake Company, Wilmerding, Pa., a corporation of Pennsylvania Application February 29, 1936, Serial No. 66,406

26 Claims. (Cl. 303—84)

This invention relates to a check valve device and more particularly to a check valve device adapted to be interposed in the supply pipe leading to the brake cylinder of a fluid pressure brake equipment, and operative to restrict or cut off the flow of fluid under pressure to the brake cylinder in case of a broken brake cylinder pipe or the like.

In the fluid pressure brake equipment installed on certain types of vehicles, a plurality of brake cylinders are employed, and on an application of the brakes, fluid under pressure is supplied to these cylinders from a common source. In some types of installations, the brake cylinders are mounted on the vehicle trucks and are connected through flexible conduits to a supply pipe, and in order to secure a rapid application of the brakes, the pipes leading from the source to the brake cylinders are made of relatively large size, and hence of large flow capacity.

There is a possibility if the pipe leading to one of the brake cylinders should be broken or develop a serious leak, or if one of the brake cylinders should develop a leak, that fluid under pressure would be released from the common source so rapidly that little or no fluid under pressure would remain for the other brake cylinders with the result that the vehicle would be left without any brakes whatever.

It is the principal object of this invention to provide means adapted to be interposed in the pipe through which fluid under pressure is supplied to a brake cylinder, and automatically operative on an abnormal flow of fluid under pressure through the pipe to cut off or restrict the rate of flow of fluid through the pipe, and thereby prevent the loss of fluid pressure in the other cylinders of the brake equipment.

A further object of the invention is to provide means responsive to differences in the pressure at spaced points in the pipe through which fluid under pressure is supplied to a brake cylinder and controlling the rate of flow of fluid through the pipe.

Another object of the invention is to provide means of the type referred to, and which incorporates means to delay its operation so that it will not restrict the flow of fluid through the pipe in response to momentary pressure differences at spaced points in the pipe, such as may occur on a rapid or emergency application of the brakes, but which will operate to restrict the flow of fluid through the pipe if this pressure differential continues for an abnormal length of time.

A further object of the invention is to provide means of the type referred to, and which does not operate to completely cut off the flow of fluid through the pipe controlled thereby, but only to restrict the rate of flow of fluid through the pipe to a relatively low rate which is less rapid than the rate at which the compressors on the vehicle can supply fluid under pressure to the brake system, so that the means will operate to prevent the complete loss of fluid from the brake system, but at the same time will not render inoperative the brake cylinder with which it is associated if the brake cylinder and its connection remain intact.

Other objects of the invention and features of novelty will be apparent from the following description taken in connection with the accompanying drawing, the single figure of which is a fragmentary diagrammatic view, largely in section, of a brake equipment incorporating a check valve device embodying this invention.

Referring to the drawing, the brake equipment therein illustrated comprises a brake controlling valve device 1, a check valve device 2, and brake cylinders 4 and 5.

The brake controlling valve device 1 may be of any well known construction and is adapted to control the supply of fluid under pressure to and the release of fluid under pressure from the brake cylinders 4 and 5.

The brake controlling device 1 supplies fluid under pressure from a reservoir, not shown, which is supplied with fluid under pressure by means of a fluid compressor, not shown, which is mounted on the vehicle, and is adapted to supply fluid to the reservoir at a given rate.

The brake cylinders 4 and 5 are of the usual well known construction and are provided with pistons, not shown, which operate through suitable brake rigging on an increase in the pressure of the fluid in the brake cylinders to press the brake shoes against the wheels.

The check valve device 2 comprises a plurality of casing sections secured together, and including the sections 10, 11 and 12.

The casing section 10 has a bore therein in which is mounted a valve 15 adapted to seat upon a seat formed on the casing section 10, and controlling communication between a chamber 16 and the brake cylinder 4 which is connected to the check valve device by way of a pipe and passage 20.

The valve 15 is carried by a stem 17 which is connected to a piston 22 and intermediate the piston 22 and the valve 15 the stem carries a baffle piston or abutment 18 which is guided in the bore in which the valve 15 is mounted.

The piston 22 is reciprocable in a bore in the casing section 11, which bore is of a substantially larger diameter than the bore in the casing section 10. The piston 22 is subject on one side to the pressure of the fluid in a chamber 24 intermediate the piston and the abutment 18. The chamber 24 is in constant communication with the chamber 16 by way of a passage 26, of relatively small flow capacity extending through the abutment 18. The piston 22 is subject on the other side to the pressure of the fluid in a chamber 30.

The valve 15 is yieldingly urged to its unseated position by means of a spring 32 which extends between the casing section 10 and the abutment 18. Movement of the valve 15 by the spring 32 is limited by engagement of the piston 22 with an inwardly extending portion 34 of the casing section 11.

The casing section 12 is similar in construction to the casing section 10 and has a bore therein in which is mounted a valve 35 which is adapted to seat upon a seat formed on the casing section 12 and controlling communication between a chamber 36 and the brake cylinder 5 which is connected to the check valve device by way of a pipe and passage 40.

The valve 35 is carried by a stem 37 which is connected to a piston 42 and intermediate the piston 42 and the valve 35 the stem carries a baffle piston or abutment 38 which is guided in the bore in which the valve 35 is mounted.

The piston 42 is reciprocable in a bore in the casing section 11, which bore is of substantially larger diameter than the bore in the casing section 12. The piston 42 is subject on one side to the pressure of the fluid in a chamber 44 intermediate the piston and the abutment 38. The chamber 44 is in constant communication with the chamber 36 by way of a passage 46 of relatively small flow capacity extending through the abutment 38. The piston 42 is subject on the other side to the pressure of the fluid in the chamber 30.

The valve 35 is yieldingly urged to the unseated position by means of a spring 48 which extends between the abutment 38 and the casing section 12. Movement of the valve 35 by the spring 48 is limited by engagement of the piston 42 with the inwardly extending portion 34 of the casing section 11.

The chambers 16 and 36 are constantly connected by way of branch passages 50 and 51, respectively, with a pipe 53 which leads from the brake controlling device 1. The pipe 53 is of not less than a predetermined length, such as 3 feet, and may be as much longer as desired.

The pipe 53, the branch passages 50 and 51, and the passages and pipes 20 and 40 leading from the brake controlling valve device 1 to the brake cylinders 4 and 5 are of relatively large size so as to permit fluid under pressure to flow to the brake cylinders 4 and 5 at rapid rates and thereby produce a rapid build-up in the pressure of the fluid in the brake cylinders. The flow capacity of these passages and pipes is such that the rate of flow of fluid therethrough in the event a brake cylinder pipe should break may be substantially in excess of the rate at which the compressor on the vehicle can supply fluid under pressure to the reservoir on the vehicle.

The casing section 10 has formed therein a by-pass passage 54 which communicates with the branch passage 50 and with the passage 20 leading to the brake cylinder 4. The by-pass passage 54 extends around the valve 15 and has a choke 56 interposed therein which limits the rate of flow of fluid through the passage to a rate well within the rate at which the compressor on the vehicle is capable of supplying fluid under pressure to the usual main reservoir and thence to the vehicle brake system.

The casing section 12 has a by-pass passage 58 formed therein which communicates with the branch passage 51 and with the passage 40 leading to the brake cylinder 5. The by-pass passage 58 extends around the valve 35 and has a choke 60 interposed therein which limits the rate of flow of fluid through this by-pass passage to a rate less rapid than the rate at which the compressor on the vehicle is capable of supplying fluid under pressure to the vehicle brake system.

The chamber 30 between the pistons 22 and 42 is connected by way of a passage and pipe 64 with the chamber 66 and thereby with the pipe 53, so that pipe 64 communicates with the pipe 53 at a point which is spaced a substantial distance from the point of connection of the branch passages 50 and 51 with the pipe 53.

This construction, however, is not essential and the pipe 64 may communicate with the pipe 53 in any suitable manner at any convenient point thereon so long as pipe 64 communicates with pipe 53 at a point spaced a predetermined distance from the point at which the chambers 16 and 36 communicate with the pipe 53.

The passage 64 has a choke 68 interposed therein which restricts the rate of flow of fluid under pressure from the chamber 66 to the chamber 30.

When the brake controlling valve device 1 is in the normal release position the chamber 66 and the pipes 53 and 64 are connected to the atmosphere through the brake controlling valve device and consequently the chambers 16 and 36, which communicate with the pipe 53 by way of the branch passages 50 and 51, are connected to the atmosphere. At this time the springs 32 and 48 maintain the valves 15 and 35 in their unseated positions thereby permitting communication between the brake cylinders 4 and 5 and the chambers 16 and 36 through the passages controlled by the valves 15 and 35.

As the chambers 16 and 36 are connected to the atmosphere the brake cylinders 4 and 5 are also connected to the atmosphere, while the chambers 24 and 44 are connected to the chambers 16 and 36 through the passages 26 and 46, and thereby to the atmosphere. In addition, as the pipe 64 is connected to the atmosphere, the chamber 30 is also connected to the atmosphere.

On operation of the brake controlling valve device 1 to suply fluid under pressure to effect an application of the brakes, fluid flows to the chamber 66 and therefrom to the pipe 53. Fluid which is supplied to the pipe 53 flows therefrom by way of the branch passages 50 and 51 to the chambers 16 and 36, respectively.

On the supply of fluid under pressure to the chamber 16 fluid flows therefrom by way of the passage and pipe 20 to the brake cylinder 4. In addition, on the supply of fluid under pressure to the chamber 16 there is an increase in the pressure of the fluid in this chamber and the force exerted by this fluid on the abutment 18 supplements the force exerted by the spring 32 to maintain the valve 15 in the unseated position.

Fluid under pressure from the chamber 16 flows through the restricted passage 26 through the abutment 18 to the chamber 24 intermediate the abutment 18 and the piston 22, and this fluid acting upon the differential areas of the piston 22 and the abutment 18 serves to further increase the force tending to maintain the valve 15 in the unseated position.

After a brief time interval the pressure of the fluid in the chamber 24 builds up to substantially the same value as the pressure in the chamber 16, and, as the pressures on opposite sides of the abutment 18 are substantially equal, the valve 15 is held in the unseated position by the fluid under pressure in the chamber 24 acting upon the piston 22, and by the spring 32.

The other portion of the check valve device operates in a similar manner on the supply of fluid under pressure to the pipe 53 by the brake controlling device 1. Fluid which is supplied to the pipe 53 flows therefrom by way of the branch passage 51 to the chamber 36, and therefrom past the unseated valve 35 to the passage and pipe 40 leading to the brake cylinder 5.

On the supply of fluid under pressure to the chamber 36 there is an increase in the pressure of the fluid in this chamber and the force of the fluid acting upon the abutment 38 supplements the force exerted by the spring 48 and tending to maintain the valve 35 in the unseated position.

Fluid under pressure from the chamber 36 flows therefrom by way of the restricted passage 46 through the abutment 38 to the chamber 44 intermediate the abutment 38 and the piston 42 and acts upon the differential area of the piston 42 and the abutment 38 to further increase the force tending to maintain the valve 35 in the unseated position.

After a brief time interval the pressure of the fluid in the chamber 44 builds up to substantially the same value as the pressure in the chamber 36, and, as the pressures on opposite sides of the abutment 38 are substantially equal, the valve 35 is held in the unseated position by the fluid under pressure in the chamber 44 acting upon the piston 42, and by the spring 48.

In addition to the flow of fluid to the brake cylinders 4 and 5 through the chambers 16 and 36 of the check valve device 2 fluid will also flow to the brake cylinders 4 and 5 at restricted rates through the by-pass passages 54 and 58.

On operation of the brake controlling valve device 1 to supply fluid under pressure to the pipe 53, and therefrom to the brake cylinders 4 and 5, there will be a gradual decrease in the pressure of the fluid in the passage connecting the brake controlling valve device 1 to the brake cylinders from a point adjacent the brake controlling valve device 1 to points adjacent the brake cylinders. The difference in the pressure between any two points in the passage leading to the brake cylinders varies with the distance between these points, and the greater this distance the larger the pressure difference will be.

There will, therefore, be a difference in the pressure of the fluid in the chambers 16 and 36, and in the chamber 66 which communicates with the pipe 53 at a point much nearer the source of supply of fluid than the point at which the chambers 16 and 36 communicate with the supply pipe.

As the pressure of the fluid in the brake cylinders 4 and 5 builds up, however, the drop in pressure throughout the length of the passage leading to the brake cylinders will decrease, and the difference between the pressures in the chambers 16 and 36 and in the chamber 66 will decrease.

On operation of the brake controlling valve device 1 to supply fluid under pressure to the brake cylinders, fluid under pressure flows from the chamber 66 through the pipe 64 and the choke 68 to the chamber 30 intermediate the pistons 22 and 42.

As the pipe 64 which supplies fluid under pressure to the chamber 30 communicates with the chamber 66, and as the pressure of the fluid in the chamber 66 substantially exceeds the pressure of the fluid in the chambers 16 and 36, as explained above, the pressure of the fluid supplied to the pipe 64 will exceed the pressure of the fluid in the chambers 16 and 36 on the initial supply of fluid under pressure to the brake cylinder. However, the rate of flow of fluid from the pipe 64 to the chamber 30 is restricted by the choke 68 so that the increase in the pressure of the fluid in the chamber 30 is delayed.

If the brake equipment is functioning in a normal manner there will be a rapid increase in the pressure of the fluid in the brake cylinders 4 and 5 because of the relatively large flow capacity of the passages leading thereto. On an increase in the pressure of the fluid in the brake cylinders 4 and 5 there will be a corresponding increase in the pressure of the fluid in the chambers 16 and 36 of the check valve device 2. On an increase in the pressure of the fluid in the chambers 16 and 36 there will be an increase in the force exerted by the fluid under pressure in these chambers on the abutments 18 and 38 and tending to maintain the valves 15 and 35 in the unseated position.

In addition, on an increase in the pressure of the fluid in the chambers 16 and 36 fluid will flow therefrom through the restricted passages 26 and 46 through the abutments 18 and 38 to the chambers 24 and 44, and the fluid in these chambers acting upon the pistons 22 and 42 will increase the force tending to maintain the valves 15 and 35 in the unseated position against the opposing force of the fluid under pressure in the chamber 30 between the pistons 22 and 42.

The various parts of the apparatus are arranged and proportioned so that during normal operation of the equipment, with all of the pipe connections to the brake cylinders intact, the pressure of the fluid in the brake cylinders will build up rapidly enough to cause the pressure differential in the passages leading to the brake cylinders to decrease quickly, and to cause a sufficiently rapid increase in the pressure of the fluid in the chambers 16 and 36, that the increase in the force exerted by the fluid under pressure in the chambers 16 and 36 acting on the abutments 18 and 38, and the increase in the pressure of the fluid in the chambers 24 and 44 acting on the pistons 22 and 42 and supplementing the force exerted by the springs 32 and 48 on the valves 15 and 35 and tending to maintain the valves in their unseated positions is rapid enough to offset the slowly increasing force of the fluid under pressure in the chamber 30, intermediate the pistons 22 and 42 and acting on these pistons and tending to move the valves 15 and 35 to their seated positions.

As the forces tending to prevent movement of the valves 15 and 35 to their seated positions increase rapidly enough to offset the increase in the force tending to move these devices to their seated positions, the valves 15 and 35 are maintained in their unseated position by the springs 32 and 48.

On operation of the brake controlling valve device 1 to cut off the supply of fluid under pressure to the brake cylinders, or upon an increase in the pressure of the fluid in the brake cylinders substantially to a pressure equal to that of the source from which fluid is supplied by the brake controlling device 1, the pressure of the fluid in the brake cylinders and in the various portions of the passages and pipes leading from the brake controlling valve device 1 to the brake cylinders will equalize, and the pressure of the fluid in the chamber 30 between the pistons 32 and 42, and in the chambers 24 and 44 will gradually build up to substantially the pressure established in the brake cylinders 4 and 5. As the pressures on opposite sides of the pistons 22 and 42 are substantially equal the valves 15 and 35 will be maintained in their unseated positions by the springs 32 and 48.

On operation of the brake controlling valve device 1 to release fluid under pressure from the brake cylinders, fluid will flow from the brake cylinders 4 and 5 by way of the pipes and passages 20 and 40 past the unseated valves 15 and 35 to the chambers 16 and 36, and therefrom by way of the branch passages 50 and 51 to the pipe 53 which leads to the brake controlling valve device 1.

On operation of the brake controlling valve device 1 to release fluid under pressure from the brake cylinders fluid is released from the chamber 66, and fluid will flow thereto from the chamber 30 through the choke 68 to the passage and pipe 64, thereby reducing the pressure of the fluid in the chamber 30, and decreasing the force exerted by this fluid on the pistons 22 and 42 and tending to move the valves 15 and 35 to their seated positions.

At the same time there will be a reduction in the pressure of the fluid in the chambers 16 and 36 and fluid will flow thereto from the chambers 24 and 44 through the passages 26 and 46, respectively. The rate of reduction in the pressure of the fluid in the chambers 24 and 44 by the flow of fluid therefrom through the passages 26 and 46 is such that the reduction in the force exerted by the fluid under pressure in these chambers on the differential areas of the pistons 22 and 42, together with the reduction in the force exerted on the abutments 18 and 38 by the reducing pressure in the chambers 16 and 36 will take place slowly enough to prevent the reducing pressure in the chamber 30 intermediate the pistons 22 and 42 from moving the valves 15 and 35 to their seated positions against the springs 32 and 48.

This method of operation is facilitated by the fact that during the release of the brakes the chambers 16 and 36 are nearer the source of fluid under pressure, in this case the brake cylinders, than the chamber 66. The pressure of the fluid in the chamber 66, therefore will be somewhat less than the pressure of the fluid in the chambers 16 and 36 while fluid is being released from the brake cylinders. As a result, the difference between the pressure of the fluid in the chamber 30 and the pressure of the fluid in the chamber 66 will be somewhat greater than the difference between the pressures in the chambers 24 and 44 and the chambers 16 and 36, and fluid will tend to flow from the chamber 30 somewhat more rapidly than it flows from the chambers 24 and 44. This will cause a more rapid reduction in the pressure of the fluid in the chamber 30 than in the chambers 24 and 44, and facilitates operation of the fluid in the chambers 24 and 44 to maintain the valves 15 and 35 in their unseated positions.

The valves 15 and 35, therefore, will be maintained in their unseated positions by the springs 32 and 48, and fluid under pressure may flow from the brake cylinders 4 and 5 past the valves 15 and 35 to the chambers 16 and 36 at relatively rapid rates and therefrom by way of the branch passages 50 and 51 to the pipe 53 which communicates with the brake controlling device 1 which controls the release of fluid under pressure from the pipe 53 to the atmosphere.

It will be seen, therefore, that during normal operation of the brake equipment, with all of the connections to the brake cylinders intact, the check valve device provided by this invention does not affect the supply and release of fluid under pressure to and from the brake cylinders 4 and 5, and permits both the supply and release of fluid under pressure to and from the brake cylinders to be effected at relatively rapid rates.

In the event, however, that the pipe leading to one of the brake cylinders should be broken or should develop a leak of serious proportions, the check valve device provided by this invention operates automatically to cut off, or at least restrict the rate of flow of fluid to the pipe so affected and thereby preserve the supply of fluid under pressure for the other of the brake cylinders, thus preventing a complete loss of brakes on the vehicle.

If the pipe 20 leading to brake cylinder 4 is broken or develops a serious leak, then on the subsequent operation of the brake controlling valve device 1 to supply fluid under pressure to the pipe 53 fluid will flow from the pipe 53 through the branch passage to the chamber 16 and past the unseated valve 15 to the passage and pipe 20 leading to the brake cylinder 4.

If the pipe 20 is either broken or leaking seriously the pressure of the fluid in the brake cylinder 4 will not increase and there will be no substantial increase in the pressure of the fluid in the chamber 16, and hence there will be no substantial increase in the force exerted by the fluid in the chamber 16 on the abutment 18, nor will there be a substantial increase in the pressure of the fluid in the chamber 24 and acting on the piston 22 to maintain the valve 15 in the unseated position.

On the supply of fluid under pressure by the brake controlling valve device 1 to the pipe 53, fluid is also supplied to the chamber 66 from which it flows by way of the pipe and passage 64 and through the choke 68 to the chamber 30 intermediate the pistons 22 and 42.

During the supply of fluid under pressure to the pipe 53 while fluid under pressure is escaping therefrom at a rapid rate, such as may occur when a pipe leading to a brake cylinder is broken, there will be a gradual reduction in the pressure of the fluid in the pipe 53 throughout the length of this pipe.

The chamber 30 is supplied with fluid under pressure from the chamber 66 which communicates with the pipe 53 at a point much nearer the source of supply of fluid to this pipe than the point on the pipe 53 from which fluid is supplied to the chamber 16. The pressure of the fluid supplied to the chamber 66, and therefrom to the chamber 30, will be substantially higher than the pressure of the fluid supplied to the chamber 16. The choke 68 restricts the rate of flow of fluid to the chamber 30, but after a short time interval the pressure of the fluid in the chamber 30 will be built up to a value substantially above the pressure in the chambers 16 and 24.

When the pressure of the fluid in the chamber 30 has increased to a predetermined value, the force exerted by the fluid in this chamber on the piston 22 is sufficient to overcome the opposing force of the spring 32, of the fluid under pressure in the chamber 16 acting upon the abutment 18, and of the fluid in the chamber 24 acting on the piston 22, and the valve 15 will thereupon be moved to the seated position to cut off the flow of fluid from the chamber 16 to the passage and pipe 20.

On movement of the piston 22 in the direction to move the valve 15 to the seated position there is a reduction in the volume of the chamber 24 with the result that there is an increase in the pressure of the fluid in this chamber. On this movement of the piston 22 there will be an increase in the volume of the chamber 30 and a corresponding decrease in the pressure of the fluid in this chamber.

The increase in the pressure of the fluid in the chamber 24 results in an increase in the force opposing movement of the valve 15 to the seated position, while the reduction in the pressure of the fluid in the chamber 30 results in a reduction in the force tending to move the valve 15 to the seated position. These changes in the pressures in the chambers 24 and 30, and, therefore, in the forces tending to move the valve 15 to the seated position, check or retard movement of the valve to the seated position.

The fluid under pressure present in the chamber 24 is gradually released by flow therefrom through the passage 26 to the chamber 16 and therefrom past the valve 15 to the atmosphere, while the pressure of the fluid in the chamber 30 will be increased by the supply of fluid thereto through the choke 68.

As the pressure of the fluid in the chamber 24 reduces, and as the pressure of the fluid in the chamber 30 builds up, the piston 22 is moved in the direction to move the valve 15 to the seated position. The valve 15 will be moved to the seated position very gently, however, and will not engage its seat so violently as to result in damage to the valve or the seat.

On operation of the brake controlling valve device 1 to supply fluid under pressure to the pipe 53 fluid will flow therefrom through the branch passage 51 to the chamber 36. Fluid supplied to the chamber 36 flows past the unseated valve 35 to the passage and pipe 40 leading to the brake cylinder 5. As a result of the flow of fluid to the brake cylinder 5 there will be an increase in the pressure of the fluid in this brake cylinder and there will be a corresponding increase in the pressure of the fluid in the chamber 36, and on an increase in the pressure of the fluid in the chamber 36 fluid will flow therefrom through the restricted passage 46 to the chamber 44, thereby increasing the pressure of the fluid in this chamber, and increasing the force exerted on the piston 42 and supplementing the force exerted by the spring 48, and tending to maintain the valve 35 in the unseated position, as explained in detail above.

The valve 35 is maintained in the unseated position at this time even though there is an increase in the pressure of the fluid in the chamber 30, as the increase in the pressure of the fluid in the chamber 36 and in the chamber 44, because of the increase in pressure in the brake cylinder 5, is sufficient to offset the increase in pressure in the chamber 30 and prevent movement of the valve 35 to the seated position by the fluid under pressure in the chamber 30 acting on the face of the piston 42.

On movement of the valve 15 to the seated position fluid will continue to flow to the passage and pipe 20 through the by-pass passage 54, and the choke 56. The rate of flow of fluid through this passage, however, is much less rapid than the rate at which fluid is supplied to the pipe 20 by way of the chamber 16 when the valve 15 is in the unseated position. The flow capacity of the choke 56 is such that the rate of flow of fluid through the choke is less rapid than the rate at which fluid can be supplied to the brake system by the compressor carried by the vehicle. The compressor, therefore, will be able to maintain the pressure of the fluid in the brake system and there will be no failure of the other brake cylinders as a result of the escape of fluid under pressure through the choke 56 to the passage and pipe 20 and therefrom to the atmosphere.

On movement of the valve 15 to the seated position the flow of fluid from the chamber 16 to the passage and pipe 20 is cut off, and as fluid continues to be supplied to the chamber 16 from the passage 50 there is an increase in the pressure of the fluid in the chamber 16.

When the valve 15 is in the seated position the valve is subjected to the opposing pressures of the fluid in the chamber 16 and of the fluid in the passage and pipe 20. The fluid in the passage and pipe 20 will be at a relatively low pressure at this time because of the relatively low rate at which fluid is supplied thereto and the relatively high rate at which fluid can escape therefrom. There will be, therefore, a relatively great difference in the pressures of the fluid on opposite sides of the valve 15, and a substantial force will be exerted on the valve by the fluid under pressure in the chamber 16 tending to maintain the valve in the seated position.

On the increase in the pressure of the fluid in the chamber 16 there will be a similar increase in the force exerted by the fluid in this chamber on the abutment 18 and tending to move the valve 15 to the unseated position. The head of the valve 15 and the abutment 18 are arranged and proportioned so that when the valve 15 is moved to the seated position, the force exerted by the spring 32 and by the fluid under pressure in the chamber 16 acting on the differential area of the abutment 18, as compared with the area of the head of the valve which is subject to the pressure of the fluid in the chamber 16, is insufficient to move the valve away from its seat against the force exerted by the fluid under pressure in the chamber 30 acting on the face of the piston 22.

Fluid under pressure from the chamber 16 flows therefrom through the restricted passage 26 through the abutment 18 to the chamber 24 until the pressure of the fluid in the chamber 24 on one face of the piston 22 equalizes with that in the chamber 30 on the opposite face of the piston 22.

When this condition occurs the valve 15 will be urged away from its seat by combined forces of the spring 32, of the relatively low pressure in passage 20 acting on a face of the valve, and of the pressure of the fluid in the chamber 24 acting upon the face of the piston 22.

The valve 15 will be urged toward the seated position by the fluid under pressure in the chamber 30 acting on the face of the piston 22 and the force exerted by this fluid on the piston 22 will be substantially equal to the force exerted on the piston by the fluid in the chamber 24 on the opposite side of the piston.

The valve 15 will also be urged to the seated position at this time by the pressure of the fluid in the chamber 16 acting upon the valve, and tending to hold the valve in engagement with its seat. The valve and the spring 32 are arranged and proportioned so that under these conditions the force exerted by the fluid under pressure in the chamber 16 and acting upon the valve is sufficient to maintain the valve in the seated position, and prevent its movement away from its seat by the spring 32, and the force exerted by the fluid under pressure in the passage 20 and acting on the valve.

If for any reason, while the valve 15 is in the seated position, the piston 22 should move in the direction to move the valve 15 away from its seat, there will be a reduction in the volume of the chamber 30 and a corresponding increase in the pressure of the fluid in this chamber, while there is also an increase in the volume of the chamber 24 and a corresponding decrease in the pressure of the fluid in this chamber.

As a result of the increase in the pressure of the fluid in the chamber 30 there will be an increase in the force tending to move the valve 15 to its seat, while as a result of the decrease in the pressure of the fluid in the chamber 24 there will be a reduction in the force tending to move the valve 15 away from its seat.

Movement of the valve 15 away from its seat, therefore, will be resisted because of the changes in the forces operating on the valve which take place on this movement of the valve, and if the valve does move away from the seated position it will be returned promptly to the seated position. This prevents unintended movements of the valve 15 into and out of engagement with its seat. It will be seen, therefore, that in the event that the pipe leading to a brake cylinder is broken, or is leaking badly, so that fluid under pressure continues to flow to the brake cylinder pipe at a relatively rapid rate for a period longer than normally required to build up the pressure in the brake cylinder to effect an application of the brakes, the check valve device provided by this invention operates automatically to cut off or restrict the rate of flow of fluid to the brake cylinder pipe and thereby prevent failure of the other portions of the brake equipment on the vehicle. It will be seen also that on movement of a valve to the seated position it is maintained in this position even after the pressure of the fluid in the passage controlled thereby has increased substantially to the pressure normally established in the brake cylinder.

On operation of the brake controlling valve device 1 to release fluid under pressure from the brake cylinder, fluid is released from the pipe 53 and connecting passages, and fluid will thereupon flow of the pipe 53 from the brake cylinder 5 by way of the pipe and passage 40, past the unseated valve 35 to the chamber 36, and then by way of the branch passage 51 to the pipe 53 and to the brake controlling valve device 1 from which it may flow to the atmosphere.

In addition, on operation of the brake controlling valve device 1 to release fluid under pressure from the brake cylinder, fluid is released from the chamber 66 and fluid will thereupon be released from the chamber 30 through the choke 68 and the pipe 64. On this reduction in the pressure of the fluid in the chamber 30 the fluid under pressure present in the chamber 24, assisted by the spring 32 will move the valve 15 away from its seat. The fluid in the chamber 16 may thereupon flow to the atmosphere through the passage and pipe 20, while the fluid under pressure present in the chamber 24 will escape therefrom through the restricted passage 26 to the chamber 16, and thence to the atmosphere.

On operation of the brake controlling valve device 1 to again supply fluid under pressure to the brake cylinders fluid will be supplied to the brake cylinder 5 in the manner described in detail above, while the valve 15 will be operated as described in detail above to cut off or restrict the supply of fluid under pressure to the passage and pipe 20 after a predetermined time interval.

If the pipe 20 leading to the brake cylinder 4 remains intact and the pipe 40 leading to the brake cylinder 5 is broken or develops a leak of serious proportions, the valve 35 will operate to cut off or restrict the rate of flow of fluid to the pipe 40 in substantially the same manner as the valve 15 operated to cut off or restrict the rate of flow of fluid through the pipe 20.

On operation of the valve 35 to restrict the rate of flow of fluid to the passage and pipe 40, fluid under pressure continues to be supplied to the passage and pipe 40 by way of the by-pass passage 58 and the choke 60, but the rate of flow of fluid is substantially less rapid than the rate at which fluid is supplied to the passage and pipe 40 when the valve 35 is in the unseated position. The rate of flow of fluid through the choke 60 is such that it is less rapid than the rate at which the compressor on the vehicle can supply fluid under pressure to the brake system, with the result that the compressor will be able to maintain the pressure in the system, and there will be no failure of the brake equipment as a result of the escape of fluid under pressure through the pipe and passage 40.

This check valve device incorporates means to permit fluid to be supplied to the brake cylinders at restricted rates so that a brake cylinder will not be rendered inoperative if the check valve device should operate improperly or if a valve should hold in the seated position.

If any one of the valves should be operated too soon, or if it should hold in the seated position, fluid under pressure will flow to the brake cylinder by way of the by-pass passage and the choke and will establish a pressure in the brake cylinder which will effect an application of the brake controlled by the piston of the brake cylinder. The rate of build-up in the brake cylinder will not be as rapid, however, as is the case when the valve device is operating properly, but the by-pass passage prevents the valve from rendering the brake cylinder completely inoperative.

The by-pass passages 54 and 58 also operate to permit fluid under pressure to be supplied to the brake cylinders at restricted rates if for any reason the build-up in brake cylinder pressure does not take place at the normal rate and the check valve device operates to close the passage controlled thereby.

This condition may arise if the pipe 53 leading from the brake controlling valve device 1 to the brake cylinders becomes partially restricted by the deposit of frost or ice thereon, or by the accumulation of dirt or foreign material therein. This will reduce the rate of flow of fluid from the brake controlling valve device 1 to the brake cylinders 4 and 5 and will restrict the rate of build-up of pressure in the brake cylinders and also in the portions of the check valve device 2 which communicate with the pipe 53 and with the brake cylinders.

If the build-up in the pressure of the fluid in the chambers 16 and 24, which control the valve 15, and in the chambers 36 and 44, which control the valve 35, is delayed too long, the force exerted by the fluid in these chambers together with the force exerted by the springs 32 and 48 will be insufficient to prevent movement of the valves 15 and 35 by the fluid under pressure in the chamber 30 intermediate the pistons 22 and 42, which is constantly increasing in pressure at the normal rate because it is supplied with fluid under pressure at the normal rate.

If the valves 15 and 35 should be moved to their seated positions as a result of a condition of this kind, the brake cylinders 4 and 5 will continue to be supplied with fluid under pressure at restricted rates through the by-pass passages 54 and 58 so that the vehicle is not deprived of all of its braking power.

While one embodiment of the improved check valve device provided by this invention has been illustrated and described in detail, it should be understood that the invention is not limited to these details of construction and that numerous changes and modifications may be made without departing from the scope of the following claims.

Having now described our invention, what we claim as new and desire to secure by Letters Patent, is:

1. In a fluid pressure brake equipment, in combination, a brake cylinder, a communication through which fluid pressure may be supplied to the brake cylinder, valve means controlling the flow of fluid to the brake cylinder through said communication, and movable abutment means responsive to differences in the pressure of the fluid in said communication at a given point therein and of the opposing pressure of fluid at a point therein spaced a substantial distance from said given point for operating said valve means.

2. In a fluid pressure braking equipment, in combination, a brake cylinder, a communication through which fluid under pressure may be supplied to the brake cylinder, valve means controlling the flow of fluid to the brake cylinder through said communication, and movable abutment means responsive to differences in the pressure of fluid in said communication at points therein spaced apart a substantial distance for operating said valve means.

3. In a fluid pressure brake equipment, in combination, a brake cylinder, a communication through which fluid under pressure may be supplied to the brake cylinder, valve means controlling the flow of fluid to the brake cylinder through said communication, and movable abutment means for operating said valve means, the movable abutment means being responsive to differences in the pressure of the fluid in said communication at points therein spaced apart a substantial distance and being operative on a predetermined reduction on the pressure of the fluid in said communication at the one of the said points adjacent the brake cylinder below the pressure of the fluid in the communication at the other of said spaced points to cut off the flow of fluid through said communication.

4. In a fluid pressure brake equipment, in combination, a brake cylinder, a communication through which fluid under pressure may be supplied to the brake cylinder, valve means controlling the flow of fluid to the brake cylinder through said communication, and movable abutment means responsive to differences in the pressure of the fluid in said communication at points therein spaced apart a substantial distance, and being operative on a predetermined increase in the difference in the said pressures to cut off the flow of fluid through the said communication.

5. In a fluid pressure brake equipment, in combination, a plurality of brake cylinders, a supply passage, each of the brake cylinders communicating with the supply passage by way of a branch passage, each of the branch passages having valve means associated therewith and are adapted to control the flow of fluid therethrough, a movable abutment associated with each of said valve means, said movable abutments being responsive to differences in the pressure of the fluid in the branch passage controlled by the valve means with which the abutment is associated and of the pressure in the supply passage at a point in the supply passage substantially nearer the source of fluid under pressure than the point at which the branch passage communicates with the supply passage.

6. In a fluid pressure brake equipment, in combination, a brake cylinder, a passage through which fluid under pressure may be supplied to the brake cylinder, valve means controlling the flow of fluid through said passage, and movable abutment means for operating the valve means, the movable abutment means being subject to the opposing pressures of the fluid in chambers which communicate with the supply passage at spaced points therein through communications which permit fluid to flow between the supply passage and said chambers only at restricted rates.

7. In a fluid pressure brake equipment, in combination, a brake cylinder, a passage through which fluid under pressure may be supplied to the brake cylinder, valve means controlling the flow of fluid through said passage, and movable abutment means subject to the opposing pressures of the fluid in chambers which communicate with said passage at spaced points therein for operating the valve means, the fluid in the chamber which communicates with the passage at the one of the points nearer the brake cylinder urging the abutment means in a direction to operate the valve means to permit the flow of fluid through said passage, the fluid in the other chamber urging the abutment means in a direction to operate the valve means to cut off the flow of fluid through said passage.

8. In a fluid pressure brake equipment, in combination, a brake cylinder, a passage through which fluid under pressure may be supplied to the brake cylinder, valve means controlling the flow of fluid through said passage, resilient means yieldingly urging the valve means to a position to permit a rapid flow of fluid through said passage, and movable abutment means subject to the opposing pressures of the fluid in said passage at points therein spaced apart a substantial distance for operating said valve means.

9. In a fluid pressure brake equipment, in combination, a brake cylinder, a passage through which fluid under pressure may be supplied to the brake cylinder, valve means controlling the flow of fluid through said passage, resilient means yieldingly opposing movement of the valve means in a direction to cut off the flow of fluid through said passage, movable abutment means subject to and operated on an increase in the pressure of the fluid in a chamber for moving the valve means to cut off the flow of fluid through said passage, means for supplying fluid under pressure at a restricted rate to said chamber from a given point on said passage, movable abutment means subject to the pressure of the fluid in a chamber for opposing movement of the valve means in the direction to cut off the flow of fluid through said passage, and means for supplying fluid under pressure to said chamber at a restricted rate from a point on the passage intermediate the brake cylinder and the point on the passage from which the fluid is supplied to the other one of the said chambers.

10. In a fluid pressure brake equipment, in combination, a brake cylinder, a passage through which fluid under pressure may be supplied to the brake cylinder, valve means controlling the flow of fluid through said passage, resilient means yieldingly opposing movement of the valve means in a direction to cut off the flow of fluid through said passage, movable abutment means subject to and operated on an increase in the pressure of the fluid in a chamber for moving the valve means to cut off the flow of fluid through said passage, means for supplying fluid under pressure to said chamber from a given point on said passage, movable abutment means subject to the pressure of the fluid in a chamber for opposing movement of the valve means in the direction to cut off the flow of fluid through said passage, and means for supplying fluid under pressure to said chamber from a point on the passage intermediate the brake cylinder and the point on the passage from which the fluid is supplied to the other of the said chambers.

11. In a fluid pressure brake equipment, in combination, a brake cylinder, a passage through which fluid under pressure may be supplied to the brake cylinder, valve means movable between spaced positions, the valve means being operative in one of said positions to permit fluid to flow through said passage at one rate and being operative in other of the said positions to permit fluid to flow through said passage only at a rate less rapid than the said one rate, and movable abutment means responsive to differences in the pressure of the fluid at points in said passage spaced apart a substantial distance for moving valve means between the said positions.

12. In a fluid pressure brake equipment, in combination, a brake cylinder, a passage through which fluid under pressure may be supplied to the brake cylinder, valve means movable between spaced positions, the valve means being operative in one of said positions to permit fluid to flow through said passage at one rate and being operative in other of the said spaced positions to permit fluid to flow through said passage only at a rate less rapid than said one rate, resilient means yieldingly urging the valve means to the position to permit fluid to flow through said passage at said one rate, and movable abutment means subject to the opposing pressures of the fluid at spaced points in said passage for moving the valve means between said positions.

13. In a fluid pressure brake equipment, in combination, a brake cylinder, a passage through which fluid under pressure may be supplied to the brake cylinder, valve means operative to permit or to cut off the flow of fluid through said passage, movable abutment means responsive to differences in the pressure of the fluid at points in said passage spaced apart a substantial distance for operating the valve means, and a by-pass passage extending around the valve means and through which fluid may flow only at a rate less rapid than the rate at which fluid may flow through the passage controlled by the valve means.

14. In a fluid pressure brake equipment, in combination, a brake cylinder, a passage through which fluid under pressure may be supplied to the brake cylinder, valve means operative to permit or cut off the flow of fluid through said passage, resilient means yieldingly urging the valve means to the position to permit fluid to flow through the said passage, movable abutment means subject to the opposing pressures of the fluid at spaced points in said passage for operating the valve means, and a by-pass passage extending around the valve means and through which fluid may flow only at a rate less rapid than the rate at which fluid may flow through the passage controlled by the valve means.

15. In a safety device for use in connection with the fluid pressure brake equipment of a vehicle having a brake cylinder, and a passage through which fluid under pressure may be supplied to the brake cylinder from a reservoir adapted to be charged with fluid under pressure supplied by a fluid compressor, the safety device comprising valve means controlling the flow of fluid from the reservoir through said passage to the brake cylinder, the valve means being movable between a position in which it permits fluid to flow through said passage at a rate more rapid than the rate at which the compressor is capable of supplying fluid to the reservoir, and a position in which it permits fluid to flow through said passage only at a rate less rapid than the rate at which the compressor is capable of supplying fluid to the reservoir, and movable abutment means subject to the opposing pressures of the fluid at spaced points in said passage for moving said valve means.

16. In a safety device for use in connection with the fluid pressure brake equipment for a vehicle comprising a plurality of brake cylinders, and means for supplying fluid under pressure to said brake cylinders from a reservoir adapted to be charged with fluid under pressure supplied by a compressor, said means including a passage through which fluid under pressure may be supplied to one of the said brake cylinders at a rate more rapid than the rate at which the compressor is capable of supplying fluid to the reservoir, the safety device comprising valve means controlling the flow of fluid through the said passage, the valve means being movable between a position in which it permits fluid to flow through the passage at a more rapid rate than the rate at which the compressor is capable of supplying fluid to the reservoir, and a position in which it permits fluid to flow through the passage only at a rate less rapid than the rate at which the compressor is capable of supplying fluid to the reservoir, and movable abutment means subject to the opposing pressures of the fluid at spaced points in said passage for moving the valve means.

17. In a fluid pressure brake equipment, in combination, a plurality of brake cylinders, a source of fluid under pressure, means for supplying fluid under pressure to said brake cylinders from said source, valve means associated with the communication through which fluid under pressure is supplied to one of said brake cylinders and being operative to cut off the flow of fluid through such communication, and movable abutment means responsive to differences in the pressure of the fluid at points in said communication spaced apart a substantial distance for operating said valve means.

18. In a fluid pressure brake equipment, in combination, a plurality of brake cylinders, a source of fluid under pressure, means for supplying fluid under pressure to said brake cylinders from said source, the communications through which fluid under pressure is supplied to each of said brake cylinders from said source having valve means associated therewith and adapted to cut off the flow of fluid through the communication, each of said valve means having movable abutment means associated therewith for operating the valve means, the abutment means each being responsive to differences in the pressure of the fluid at points spaced apart a substantial distance in the communication controlled by the valve means operated by the said abutment means.

19. In a fluid pressure brake equipment, in combination, a brake cylinder, a valve device having a communication through which fluid under pressure may be supplied to the brake cylinder, and comprising valve means controlling a passage through which fluid under pressure is supplied from said communication to the brake cylinder, and a movable abutment subject to the opposing pressures of fluid flowing through said communication at a point adjacent to said valve device and at a point remote from said valve device for operating said valve means.

20. In a fluid pressure brake equipment, in combination, a brake cylinder, a valve device having a communication through which fluid under pressure may be supplied to the brake cylinder and comprising valve means controlling a passage through which fluid under pressure is supplied from said communication to the brake cylinder, and a movable abutment for operating said valve means, said abutment having the chamber at one side connected to be supplied with fluid under pressure from said communication at a point remote from said valve device, and having the chamber at the opposite side subject to the pressure of fluid flowing from said communication to the brake cylinder.

21. In a fluid pressure brake equipment, in combination, a brake cylinder, a valve device having a communication through which fluid under pressure may be supplied to the brake cylinder, and comprising valve means controlling a passage through which fluid under pressure is supplied from said communication to the brake cylinder, a movable abutment subject to the opposing pressures of the fluid flowing through the said communication at a point adjacent to said valve device and at a point remote from said valve device for operating said valve means, the valve device having a by-pass passage through which fluid under pressure is supplied at a restricted rate when said valve means is operated to close the passage controlled by the valve means.

22. In a safety device for use in connection with the fluid pressure brake equipment of a vehicle having a brake cylinder and a passage through which fluid under pressure may be supplied to the brake cylinder from a reservoir adapted to be charged with fluid under pressure supplied by a fluid compressor, the safety device comprising valve means controlling the flow of fluid from the reservoir through said passage to the brake cylinder, the valve means being movable between a position in which it permits fluid to flow through said passage at a rate more rapid than the rate at which the compressor is capable of supplying fluid to the reservoir, and a position in which it permits fluid to flow through said passage only at a rate less rapid than the rate at which the compressor is capable of supplying fluid to the reservoir, and means responsive to the flow of fluid through said passage for moving said valve means between said positions.

23. In a safety device for use in connection with the fluid pressure brake equipment for a vehicle comprising a plurality of brake cylinders and means for supplying fluid under pressure to said brake cylinders from a reservoir adapted to be charged with fluid under pressure supplied by a compressor, said means including a passage through which fluid under pressure may be supplied to one of the brake cylinders at a rate more rapid than the rate at which the compressor is capable of supplying fluid to the reservoir, the safety device comprising valve means controlling the flow of fluid through the said passage, the valve means being movable between a position in which it permits fluid to flow through the passage at a more rapid rate than the rate at which the compressor is capable of supplying fluid to the reservoir, and a position in which it permits fluid to flow through the passage only at a rate less rapid than the rate at which the compressor is capable of supplying fluid to the reservoir, and means responsive to the flow of fluid through said passage for moving said valve means between said spaced positions.

24. In a safety device for use in connection with the fluid pressure brake equipment of a vehicle having a brake cylinder and a passage through which fluid under pressure is supplied to the brake cylinder, the safety device comprising valve means controlling the flow of fluid through said passage to the brake cylinder, the valve means being movable between a position in which it permits fluid to flow through said passage at a rapid rate and a position in which it permits fluid to flow through said passage at a restricted rate, and means responsive to the flow of fluid through said passage for moving said valve means between said positions.

25. In a safety device for use in connection with the fluid pressure brake equipment of a vehicle having a brake cylinder and a passage through which fluid under pressure may be supplied to the brake cylinder, the safety device comprising valve means controlling the flow of fluid through said passage, the valve means being movable between an open position in which it permits the flow of fluid through said passage and a closed position in which it cuts off the flow of fluid through said passage, means responsive to the flow of fluid through said passage for moving the valve means between said positions, and a by-pass passage extending around said valve means through which fluid may flow at a restricted rate.

26. In a fluid pressure brake equipment, in combination a brake cylinder, a communication through which fluid under pressure may be supplied to the brake cylinder, valve means controlling the flow of fluid to the brake cylinder through said communication, a movable abutment for operating said valve means, said abutment being subject on one side to the flow of fluid under pressure through said communication at a point adjacent to the brake cylinder and on the other side to the pressure of the fluid supplied from said communication at a point therein more remote from the brake cylinder, whereby the pressure of the fluid acting on said other side of the abutment increases at a faster rate than the pressure on the opposite side and tends to move said abutment in a direction to close said valve means.

WILLARD I. CONANT.
CLYDE C. FARMER.